US012693941B2

(12) United States Patent
Rana et al.

(10) Patent No.: US 12,693,941 B2
(45) Date of Patent: Jul. 28, 2026

(54) METHOD AND SYSTEM FOR INTERACTION STATE RESTORATION

(71) Applicant: SAP SE, Walldorf (DE)

(72) Inventors: Dharmesh Rana, Bangalore (IN); Nikita Jain, Bangalore (IN); Prannoy Katari Venkatesh, Ottawa (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/952,153

(22) Filed: Nov. 19, 2024

(65) Prior Publication Data

US 2026/0140832 A1 May 21, 2026

(51) Int. Cl.
| | |
|---|---|
| *G06F 11/1446* | (2026.01) |
| *G06F 9/451* | (2018.01) |
| *G06F 9/54* | (2006.01) |
| *G06F 16/955* | (2019.01) |

(52) U.S. Cl.
CPC .......... *G06F 11/1469* (2013.01); *G06F 9/451* (2018.02); *G06F 9/543* (2013.01); *G06F 16/9562* (2019.01); *G06F 2201/80* (2013.01)

(58) Field of Classification Search
CPC ...... G06F 11/1469; G06F 9/451; G06F 9/543; G06F 16/9562; G06F 2201/80
USPC ........................................................ 714/15
See application file for complete search history.

(56) References Cited

U.S. PATENT DOCUMENTS

| | | | |
|---|---|---|---|
| 2012/0078845 A1* | 3/2012 | Kasbekar ............. | G06Q 10/107 |
| | | | 707/E17.069 |
| 2013/0018960 A1* | 1/2013 | Knysz .................... | G06Q 10/40 |
| | | | 709/204 |

* cited by examiner

*Primary Examiner* — Yair Leibovich
(74) *Attorney, Agent, or Firm* — Buckley, Maschoff & Talwalkar LLC

(57) ABSTRACT

According to some embodiments, systems and methods are provided including a memory storing program code; and one or more processing units to execute the program code to cause the system to: receive a graphical user interface (GUI) element, the received GUI element having an initial state; receive at least one state change to the received GUI element, the state change resulting in the GUI element having a current state; generate a bookmark for the current state of the GUI element; append the generated bookmark to a presentation content file as a tag; and store the appended bookmark in the tag. Numerous other aspects are provided.

20 Claims, 16 Drawing Sheets

900

```
1    {
2          "id": "123",
3          "name": "widget2_widget_api_wrapper_789",
4          "isDefault": false,
5          "isPublic": false,
6          "version": "4.17",
7          "format": "bmk2",
8          "content":   {
9                "bookmarkAgentContents": [
10                     {
11                           "id": "bookmark.agents.ChartBookmarkAgent",
12                           "content": {
13                                 "ChartWidgets": {
14                                      "567",
15                                        "state": {
16                                            "component":{
17                                                 "id": "567",
18                                                  "class": "story.VizWidget",
19                                                 "definition": {
20                                                       "entityId": "abc",
21                                                      "VizDefinition": {
22                                                            "properties"
.
.
.
```

```
shape.tags.add("resourceTitle", widgetDetails.RESOURCETITLE);
              shape.tags.add("widgetType", widgetDetails.WIDGETTYPE);
              shape.tags.add("widgetName", widgetDetails.WIDGETNAME);
              shape.tags.add("lastRefresh", getCurrentTimestamp());
              shape.tags.add("resourceId", widgetDetails.RESOURCEID);
              shape.tags.add("widgetId", widgetDetails.WIDGETID);
              shape.tags.add("tenant", widgetDetails.TENANT);
              shape.tags.add("bookmark:, widgetDetails.BOOKMARK);
```

```
/**
 *
 * @param containerID The id of the container element
 * @param tenantUrl The url of the SAC tenant
 * @param storyIdOrDefinition The id or definition of the story
 * @param widgetId Id of the widget to be rendered
 * @param options Options impacting the rendering
 * @returns
 */
sdk -- namespace>.renderWidget(containerId: string, tenantUrl: string |
{proxy : URL}, storyIdOrDefinition: string | Object, widgetId: string options? : Options)"
```

*FIG. 11A*

```
Interface Options
    tenant? :
    ,
    bookmarkIdOrDefintion?: string | object; // In PowerPoint add-in, client will store bookmark of a widget and
apply the same to open the widget in same state with latest data.
    session?:
        // This is hidden parameter and won't be documented in public documentation
        // These params are relevant when host application has already logged-in to SAC
        csrfToken: string //CSRF token retrieved with session API call
        sessionResponse: Record<string, any>; // This is response of session API call
    ...
    filters?: filterInfo[];
    variables?: VariableInfo[];
    renderComplete?:
    onSuccess: () => void;
    onFailure: (error: Error) => void;
    ,
    attributes?:

```
/**
 *
 * @param containerID The id of the container element. This must be same as the one used in renderWidget
 * @returns bookmark definition of the rendered widget
 */
<sdk-namespace>.getBookmakr(containerID; string) : Object;
```

USER DEVICE

1435

PROCESSING UNIT(S)

RAM

1442

MODULE

1440

1442

MODULE

1440

HDD/SSD

1420

CLOUD SERVER

CLOUD SERVER

CLOUD SERVER

1435

PROCESSING UNIT(S)

RAM

1440

MODULE

1442

MODULE

1440

1442

HDD/SSD

METHOD AND SYSTEM FOR INTERACTION STATE RESTORATION

BACKGROUND

Organizations often use presentation applications to generate electronic visual slideshow presentations. A non-exhaustive example of such a presentation application is PowerPoint®. Graphic images may be included in the slideshow presentation. These graphic images may, in some instances, represent a visual display of data. Typically, a user may copy an image of a chart or other visualization from a separate data analysis application to the slideshow presentation. In some cases, interactions (e.g., drill, filter, etc.) may have been performed on the initial visualization prior to copying an image of the visualization to the slideshow presentation. Over time, the data used to generate the visualization may change, and the visualization may be refreshed with the latest data, which in turn may be copied as an image to the slideshow presentation. However, the refresh occurs for the initial visualization, not the visualization resulting from the interactions, performed on the initial visualization. It may be challenging to refresh the visualization including the interactions.

Systems and methods are desired for improving the efficiency with which visualizations and resulting images may be updated for display in a slideshow of a presentation application.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 9 is a non-exhaustive example of two bookmarks according to some embodiments.

FIG. 10 is a non-exhaustive example of a tag according to some embodiments.

FIG. 11A is a non-exhaustive example of a first Render Widget Application Programming Interfaces (APIs) according to some embodiments.

FIG. 11B is a non-exhaustive example of a second Render Widget API according to some embodiments.

FIG. 11C is a non-exhaustive example of a Get Bookmark API according to some embodiments.

Figure 1:
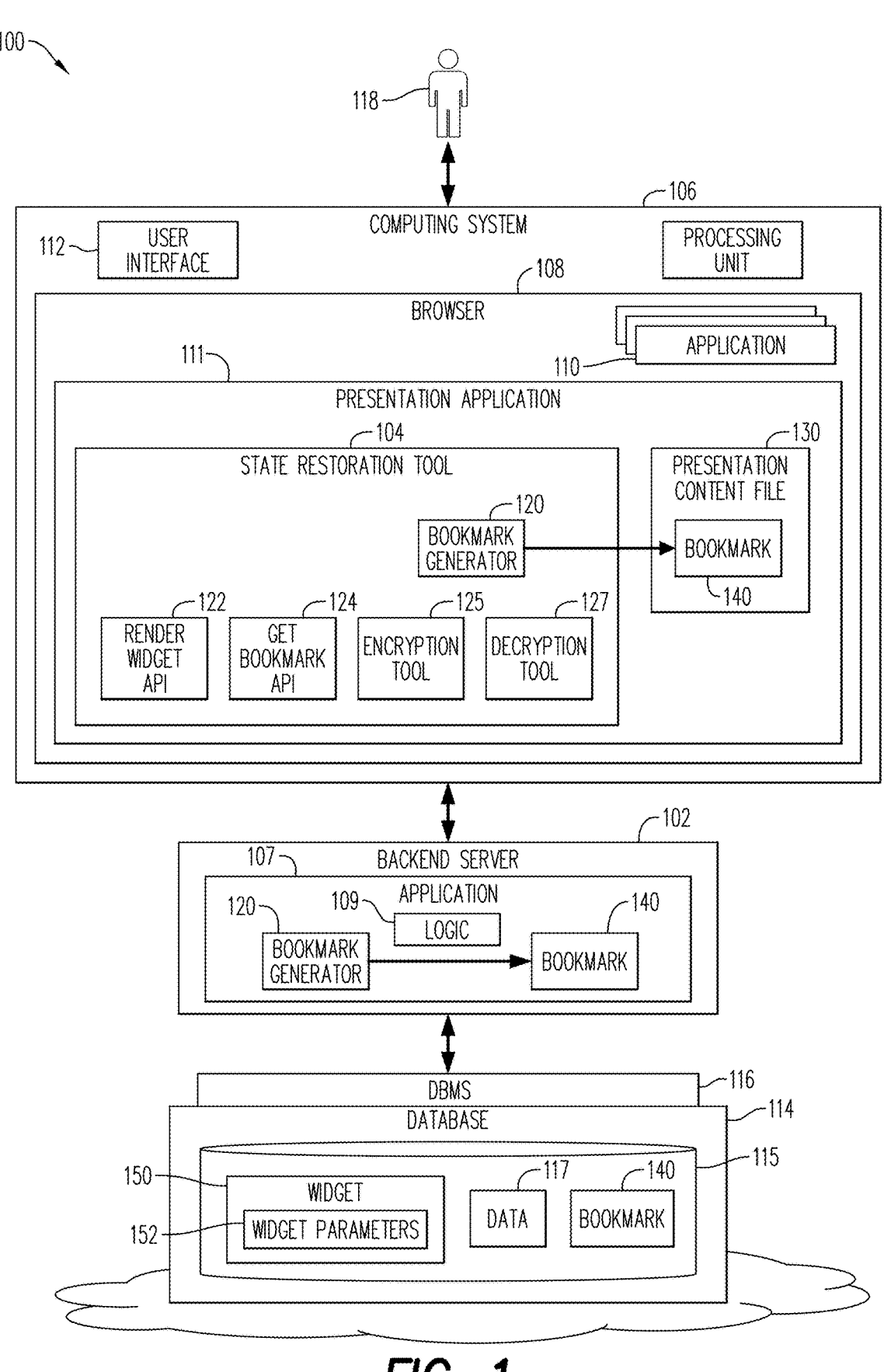
FIG. 1 is a block diagram of a system architecture according to some embodiments.

Throughout the drawings and detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, organizations often use presentation applications to generate electronic visual slideshow presentations. A non-exhaustive example of such a presentation application is PowerPoint®. Graphic images may be included in the slideshow presentation. These graphic images may, in some instances, represent a visual display of data. Typically, a user may copy an image of a chart or other visualization from a separate data analysis application to the slideshow presentation. A non-exhaustive example of a data analysis application is SAP Analytics Cloud® (SAC), which is a web-based application/data analysis tool that offers data visualization, dashboarding, reporting and forecasting. SAC may include a development environment or dashboard, referred to herein as "Stories" that allow users to tell the story of their data by capturing insights and visualizations across multiple pages. The story acts as a container object that holds all the data, visualizations and other elements. The data added to the story may be displayed in various formats, and for that display, the data is organized into measures, which are numeric values that can be aggregated and included in calculations such as Gross Margin or Quantity Sold, and dimensions, which are different characteristics that can be used to group or divide these values such as Date, Location or Product. The data may be added to the story via bringing in a local file and modeling the data, importing data using an existing model, and connecting to live data. The story may contain multiple data sources. The data added to the story may then be visualized in charts, tables, geo maps, and R visualizations. As used herein, a widget is an element of a graphical user interface that displays information or provides a specific way for a user to interact with the application. The widget may be a set of files e.g., a JavaScript Object Notation (JSON) file and a JavaScript file. As a non-exhaustive example, each visualization may be referred to as a "widget." The user may select the widget that best reflects the data to be displayed, and then maps the measures and dimensions to elements within the widget. Each type of widget may have one or more features used to customize the visualization as needed. In some cases, filters or other state changes (e.g., sort, ranking, a combine and split, adding values, removing values, etc.) may be applied to the initial widget to focus different aspects of the data. As a non-exhaustive example, the filters may be: applied to the entire story, added as input controls to pages to filter multiple widgets, or applied to data points in individual charts, tables and other visualizations.

After the visualization is completed, the user may copy an image of the current state of the widget to a PowerPoint slide, for example, as part of a slideshow presentation. Over time the data used in the visualization may change, and it may be desirable to refresh the visualization with the latest data. It is desirable to load the widget with the latest data in the same state the widget was in when the image of the widget was copied to the slide. A widget state is what determines how it renders, and updating the state changes how it looks when a user interacts with it. As a non-exhaustive example, in a case a filter was applied to the initial widget, and the image of the filtered widget was copied to the slideshow, the filtered widget is the current state of the widget. In some instances, to maintain the current state of the widget with respect to refreshing the widget, a bookmark is created for the current state of the widget and used in execution of a refresh process. The bookmark definition is a JSON document. A bookmark can store specific state or scenarios created in a story (such as resetting filters, input controls, prompts, explorer views, variances for analyzing the data in different scenarios, hierarchical levels, dropdowns, radio button groups, check-boxes, values stored in script variables, sorting, etc.) without creating multiple personal copies of the widget. A challenge with conventional bookmarks is that they are stored in the backend server of SAC. As such, every change to a widget may result in the creation of a bookmark on the server, which may consume a lot of storage resources. Additionally, in a case there are multiple bookmarks for a same initial visualization, and since the users can view the backend, the users may be confused by the multiple bookmarks for the same initial visualization. Another challenge with conventional bookmarks is that because the bookmarks are stored in the backend of the SAC, the PowerPoint slides and/or copied widget may be deleted without being connected to SAC, resulting in dangling bookmarks (e.g., bookmarks no longer attached to an image or presentation) stored in the backend, using storage resources with no purpose.

To address these problems, a state restoration framework or system provides for embedding the bookmark in a pre-sentation content file of the PowerPoint slide by appending and storing the bookmark as a tag of the presentation content file, such that the bookmark is stored in the presentation content file itself. A tag is a custom property in a presentation application that may be applied to slides, presentations or shapes. Embodiments provide for persisting the bookmark of the current state of the widget to the presentation content file when an image of the widget is copied to a slide. The data within the widget is captured as a visual snapshot and embedded in the presentation content file for the slide. The bookmark is then associated with other information in the tag used for refreshing the widget with the corresponding presentation application image. While refreshing the data, the saved state (bookmark) for the widget is passed to an Application Programming Interface (API) to render on top of the initial saved state of the story. Another API then fetches the latest data from the one or more data source and loads the initial state of the widget with the rendered bookmark with the latest data from the one or more data sources (e.g., a backend database).

FIG. 1 is a high-level block diagram of a state restoration framework or system architecture 100 according to some embodiments. The illustrated elements of system architec-ture 100 and of all other architectures depicted herein may be implemented using any suitable combination of comput-ing hardware and/or software that is or becomes known. Such combinations may include one or more programmable processors (microprocessors, central processing units, microprocessor cores, execution threads), one or more non-transitory electronic storage media, and processor-execut-able program code. In some embodiments, two or more elements of system architecture 100 are implemented by a single computing device, and/or two or more elements of system architecture 100 are co-located. One or more ele-ments of system architecture 100 may be implemented using cloud-based resources, and/or other systems which appor-tion computing resources elastically according to demand, need, price, and/or any other metric. One or more compo-nents may be implemented as a cloud service (e.g., Soft-ware-as-a-Service, Platform-as-a-Service).

System architecture 100 includes backend server 102, a state restoration tool 104, a local computing system 106 including a browser 108 running a client application 110 and user interface 112. System architecture 100 also includes a database 114, a database management system (DBMS) 116 and a client/user 118. As used herein, the terms "client", "user" and "end-user" may be used interchangeably.

The backend server 102 may include server applications 107. Server applications 107 may comprise server-side executable program code (e.g., compiled code, scripts, etc.) executing within the backend server 102 to receive queries/requests from clients/users 118, via the local computing system 106, and provide results to clients/users 118 based on data of the database 114 and application logic 109. Logic 109 of the application 107 may comprise program code to provide functionality to users 118. The functionality may comprise any functionality that is or becomes known, and providing such functionality may require access via DBMS 116 to data 117 stored in storage device 115 of database 114.

The backend server 102 may provide any suitable inter-faces through which clients/users 118 may communicate with the applications 107/110 executing thereon. The backend server 102 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface. Backend server 102 may be separated from or closely integrated with DBMS 116. A closely-integrated backend server 102 may enable execution of applications 107 completely on the database platform, without the need for an additional server. For example, backend server 102 may provide a comprehensive set of embedded services which provide end-to-end support for Web-based applications. Backend server 102 may provide application services (e.g., via functional libraries) which applications 107 may use to manage and query the database files stored in the database 114. The application services can be used to expose the database data model, with its tables, hierarchies, views and database procedures, to clients/users 118. In addition to exposing the data model, backend server 102 may host system services such as a search service, and the like.

Generally, local computing system 106 executes one or more of applications 110 to provide functionality to client/user 118. Applications 110 may comprise any software applications that are or become known, including but not limited to data analysis tools including visualizations and/or presentation applications. As will be described below, applications 110 may comprise web applications which execute within a web browser 108 of local computing system 106 and interact with corresponding server applications 107 to provide desired functionality. The client application 110 may send a user interface request (or other suitable request) to a server-side or back-end application ("server application") 107 for execution thereof. For example, when a user clicks on a button or enters information via a UI of the client application 110, a request is sent to the backend server 102. The backend server then responds with content that is then provided to the client application. The user 118 may interact with the resulting displayed user interface output from the execution of applications, to create further visualizations, reports, analyses, etc.

Presentation of a user interface as described herein may comprise any degree or type of rendering, depending on the type of user interface code generated by the backend server 102/local computing system 106.

A non-exhaustive example of the application 110 is a presentation application 111 (e.g., PowerPoint®, or other suitable presentation application). The state restoration tool 104 may be an add-in to the presentation application 111. The add-in is a software extension that adds new features or functionality to, in this case, the presentation application 111. The state restoration tool 104 includes a bookmark generator 120, a render widget API 122, and a Get bookmark API 124. The bookmark generator 120 generates a bookmark 140, as described further below. The generated bookmark 140 may be embedded as a tag in a presentation content file 130 for a slide of a presentation application 111. The render widget API 122 receives one or more widget parameters 152 as input and returns a rendered widget 150. As used herein, rendering is the process of creating a final image (e.g., translating a server's response into an image), while displaying is the process of showing that image on a screen.

In one example, user 118 may operate a user device (not shown) to execute a Web browser or another client application which provides access to user interfaces of application 110/111 via the computing system 106 and through a network (also not shown). User 118 submits a request to application 110/111 via such a user interface. The request may comprise a request to apply a state change to a visualization, to request a refresh of a visualization with the latest data 117, etc. In response, backend server 102 executes logic 109 of the corresponding application 107 to determine one or more queries of database 114 which are required to respond to the request. The queries are transmitted to database 114 via DBMS 116 and corresponding result sets are received from database 114. Logic 109 uses the result sets to formulate a response to the original request and returns the response to the computing system 106. The computing system 106 displays the response for the user 118.

Database 114 may comprise any query-responsive system for data storage and retrieval that is or becomes known. Database 114 may be cloud-based, and/or distributed. Storage device 115 may comprise one or more solid state and/or platter-based fixed disks, non-volatile random-access memories, etc. Data 117 may include database tables conforming to one or more database schemas, in row-based, column-based or other formats.

DBMS 116 serves requests to store, retrieve and/or modify data of database 114, and also performs administrative and management functions. Such functions may include snapshot and backup management, indexing, optimization, garbage collection, and/or any other database functions that are or become known. DBMS 116 may also provide application logic, such as database procedures and/or calculations, according to some embodiments. This application logic may comprise scripts, functional libraries and/or compiled program code. DBMS 116 may comprise any query-responsive database system that is or becomes known, including but not limited to a structured-query language (i.e., SQL) relational database management system.

System 100 may comprise any number of unshown hardware and software components, including, but not limited to, gateways, routers, redundant components, etc.

Figure 2:
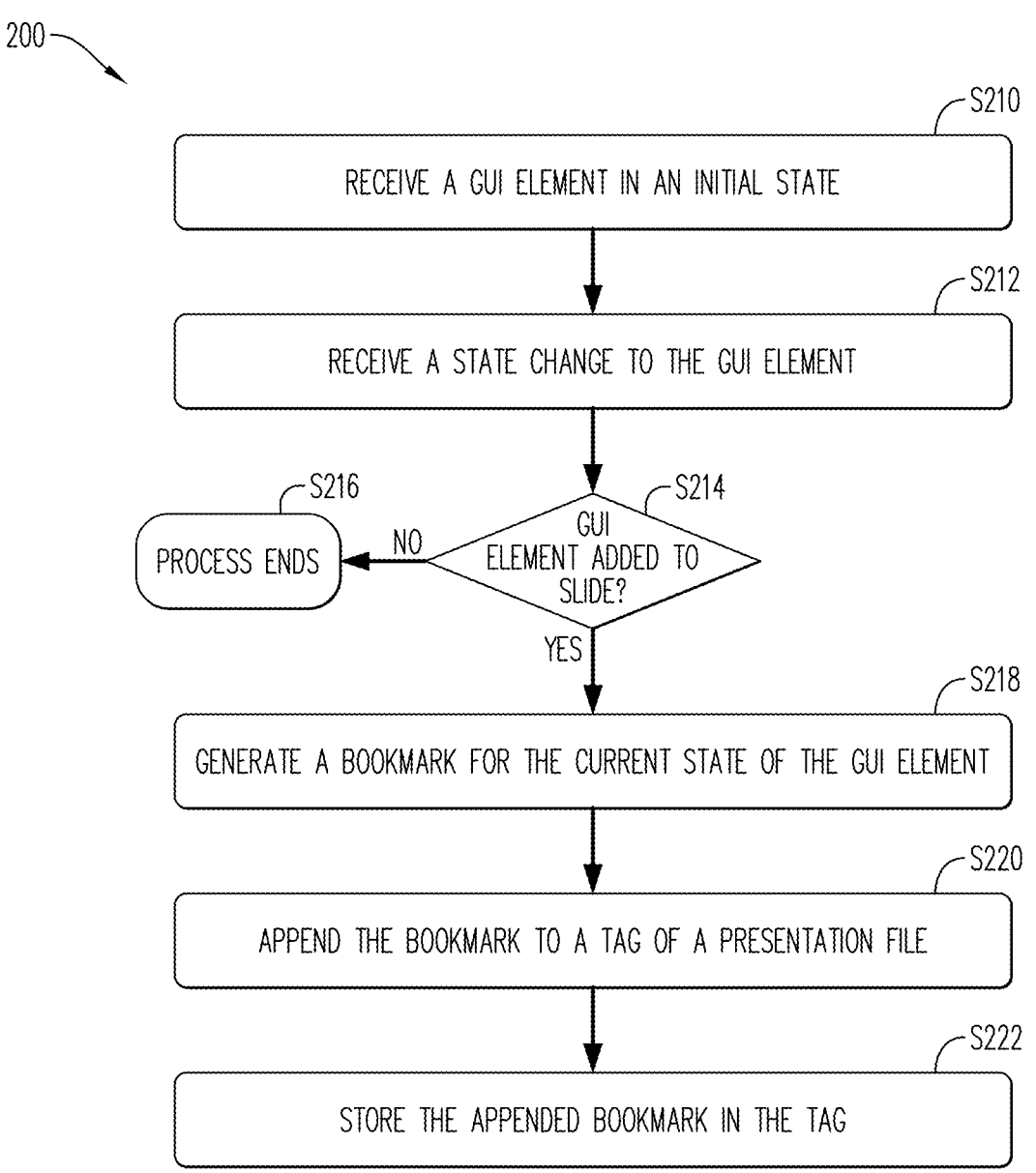
FIG. 2 is a flow diagram of a process according to some embodiments.

FIG. 2 illustrates a process 200 to create and store a bookmark according to some embodiments. The process 200, and other processes described herein (e.g., 1200), may be performed by a database node, a cloud platform, a server, a computing system (user device), a combination of devices/nodes, or the like, according to some embodiments. In one or more embodiments, the system architecture 100 may be conditioned to perform the process 200, and other processes described herein (e.g., 1200), such that a processing unit 1435 (FIG. 14) of the system architecture 100 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the start of the process, a user has opened the presentation application 111 (e.g., PowerPoint®), entered a SAC URL to connect to a SAC tenant, and entered SAC tenant details along with a username and password to log in to the SAC tenant per an SAC add-in for the presentation application 111. The add-in allows for the widgets to be directly embedded into the presentation slides, providing for the slides to be up to date with accurate data from the SAC, eliminating the need for manual updates. Embedding the widget in the presentation slides inserts the content from another source directly into the slide (and the presentation content file 130 for the slide, in particular) so that the content becomes part of the presentation content file itself, allowing a user to view it without needing the original source file separately; essentially, it's like "pasting in" the content but with a more integrated functionality. Once logged in, the user can see a list of the already-created stories. As described above, a story is a presentation-style document that uses visualizations (e.g., charts, images, text, pictograms and other objects) to analyze and describe data. The stories include pages, and the pages include widgets (visualizations). The story is in a JSON format. In addition to containing information for the visualizations, the story also contains information of the data source from which the data should be fetched. After selecting a preferred story, a list of the pages associated with the story are provided. As used herein, pages are spaces within the story where a user can place components like tables, charts and text modules. Multiple pages may be created within a story, and objects including widgets may be arranged on pages. A page may then be selected to see the available widgets from that SAC dashboard that may be used in the presentation application. Each page may include one or more widgets.

Figure 3:
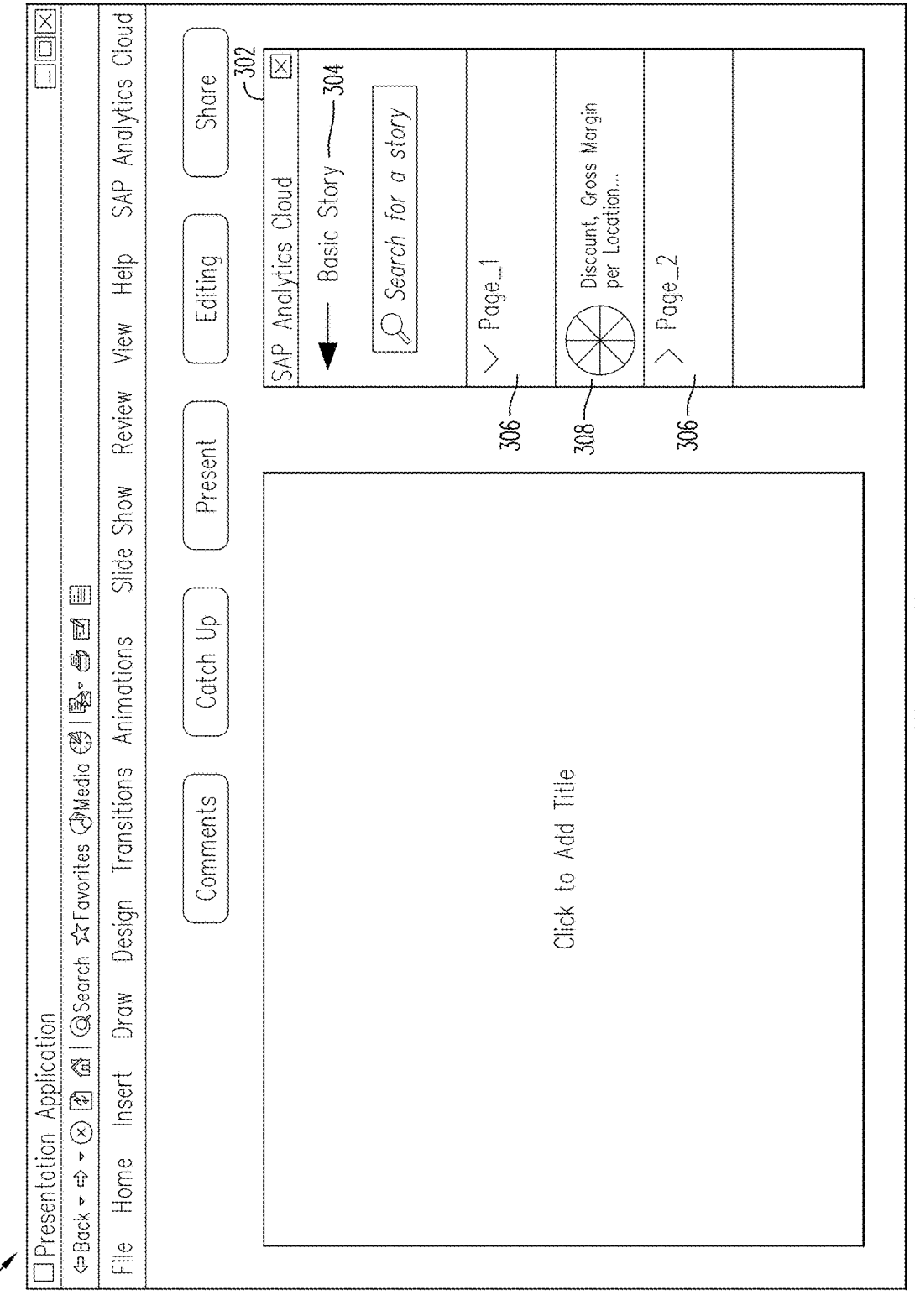
FIG. 3 is a user interface including a story and widgets according to some embodiments.

FIG. 3 is a non-exhaustive example of a user interface 300 including an SAC pane 302. The SAC pane 302 includes one or more selectable stories 304, each story 304 including at least one page 306. Here, the user has selected the story 304 entitled "Basic Story", which includes two pages 306— Page_1 and Page_2. The user has selected Page_1 to observe the drop down menu including the widgets 308 available for Page_1. Here there is one available widget 308—a pie chart for Discount, Gross Margin per Location, Product. This widget 308 is selected, as indicated by the shading.

Figure 4:
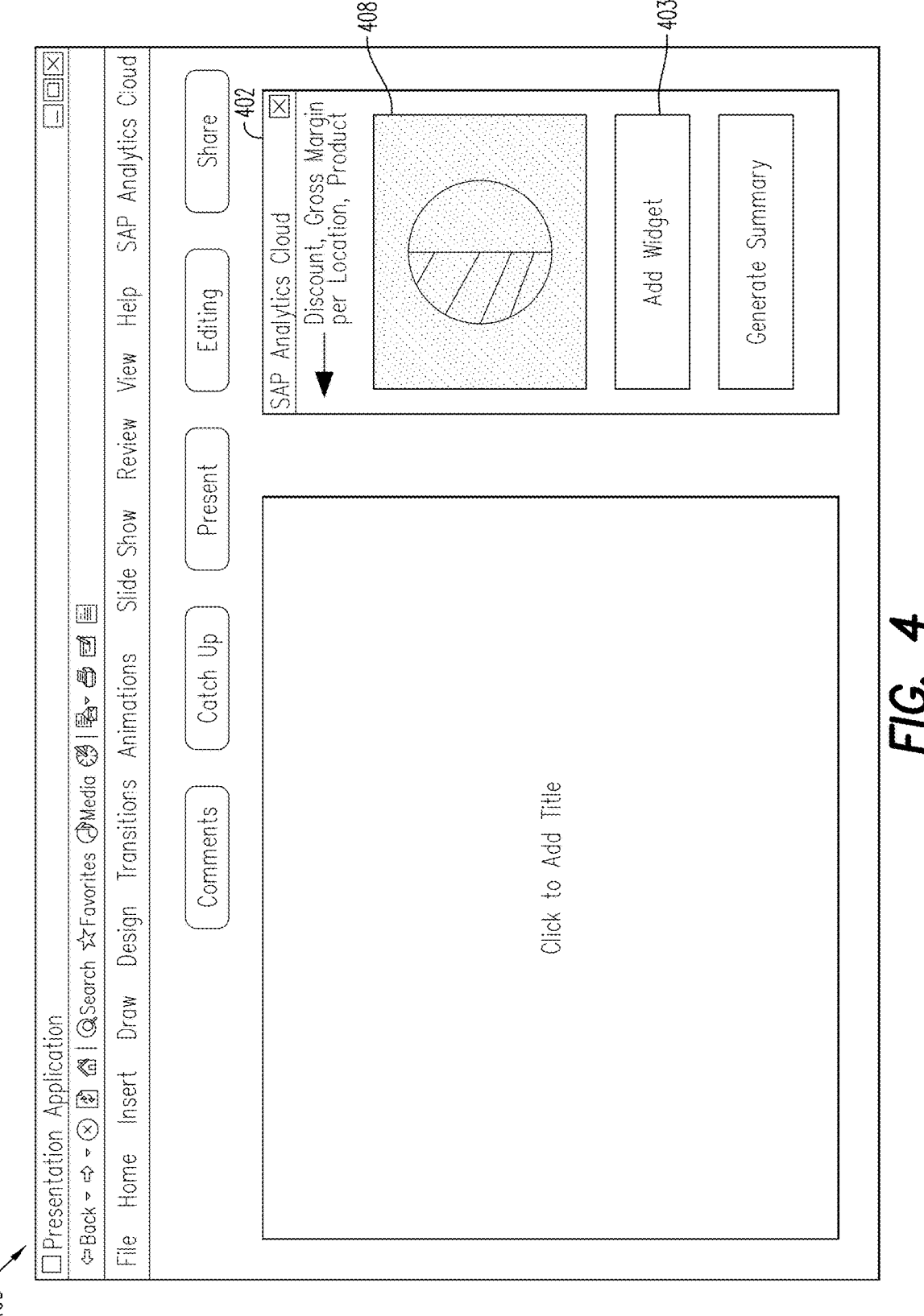
FIG. 4 is a user interface according to some embodiments.

Initially, at S210 a GUI element ("widget") 150 is received in an initial state. Selection of the widget 308 in FIG. 3, results in a user interface 400, shown in FIG. 4. Here, the SAC pane 402 displays the GUI element 408 in the initial state. The initial state is the state in which the widget was created in the data analysis application. The widget includes a plurality of widget parameters 152. The widget parameters 152 include: a container ID, which is an identifier of the container element where the widget is rendered; a tenantUrl, which is the url of the SAC tenant which will be connecting to the story ID; a story ID or definition, which is the identifier or definition of the story that has been selected; a widget ID, which is the identifier of the widget to be rendered; and options, which are additional parameters (e.g., tenant, oem, session, filters, variables, etc.) that may impact the rendering. In one or more embodiments, in response to selection of the widget 308 (FIG. 3), widget parameters 152 are passed to a render widget API 122. The render widget API 122 then uses the widget parameters 152 to render the GUI element 408 in the SAC pane 402. The GUI element 408 is rendered in the SAC pane 402 in the initial state. Selection of the rendered GUI element 408 in the SAC pane 402 (indicated by the shading) and selection of an Add Widget control 403 adds the GUI element 408 to a slide 502, as shown in FIG. 5, in a task pane 510 of the user interface 500.

Then, in S212 a state change to the GUI element 408 in the slide 502 is received. A state change changes the way data is displayed in the GUI element and may be applied to the initial state widget to focus different aspects of the data. It is noted that, pursuant to embodiments, further state changes may be applied to a widget that has had previous state changes. For ease of discussion, the non-exhaustive examples described herein are focused on an initial state and a state change to the initial state. The state changes may be at least one of a filter, a sort, a ranking, a combine and split, adding values and removing values. To apply a state change, the GUI element 408 is edited in a preview pane 600 (FIG. 6).

Figure 5:
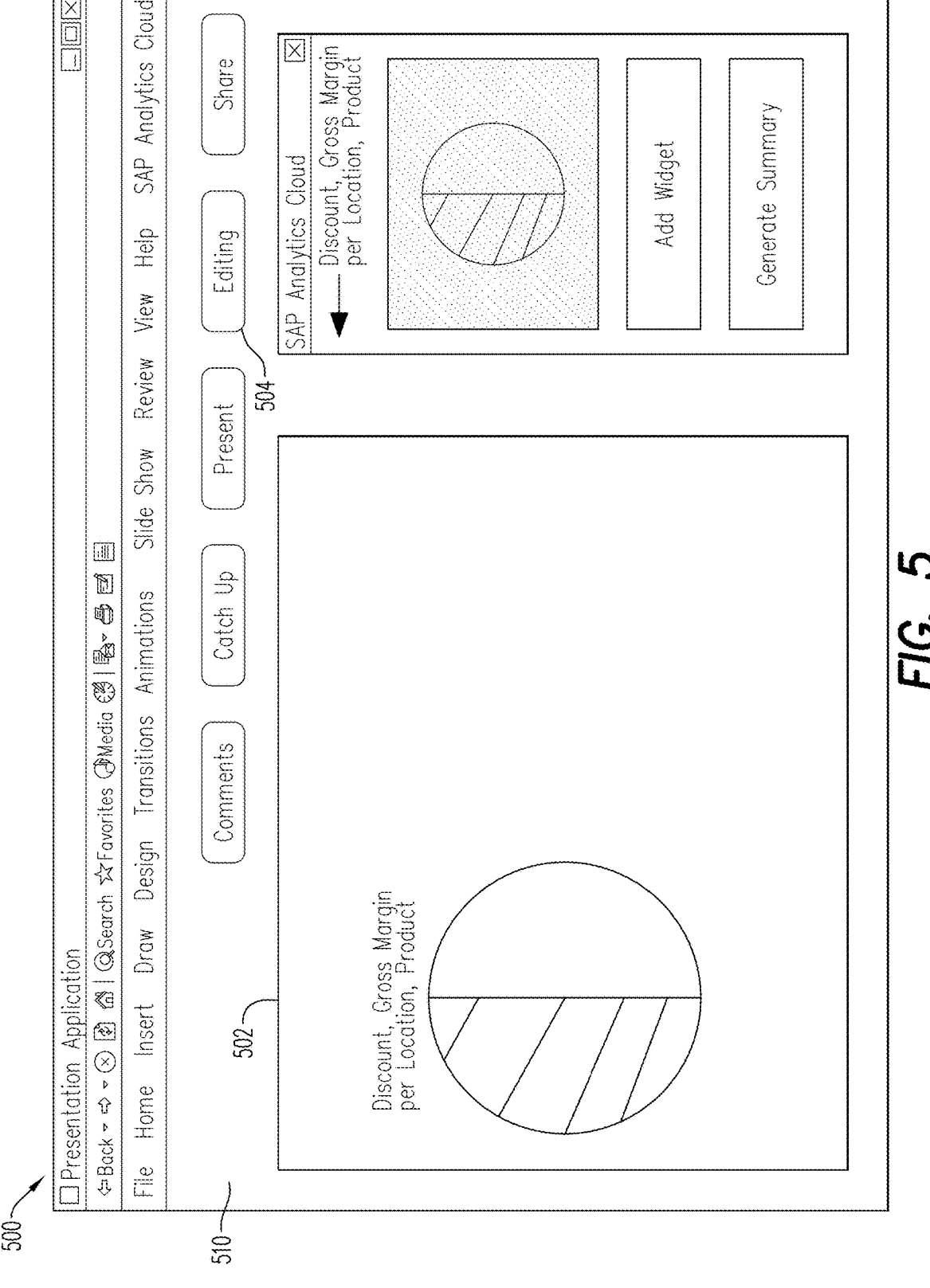
FIG. 5 is a user interface according to some embodiments.
Figure 6:
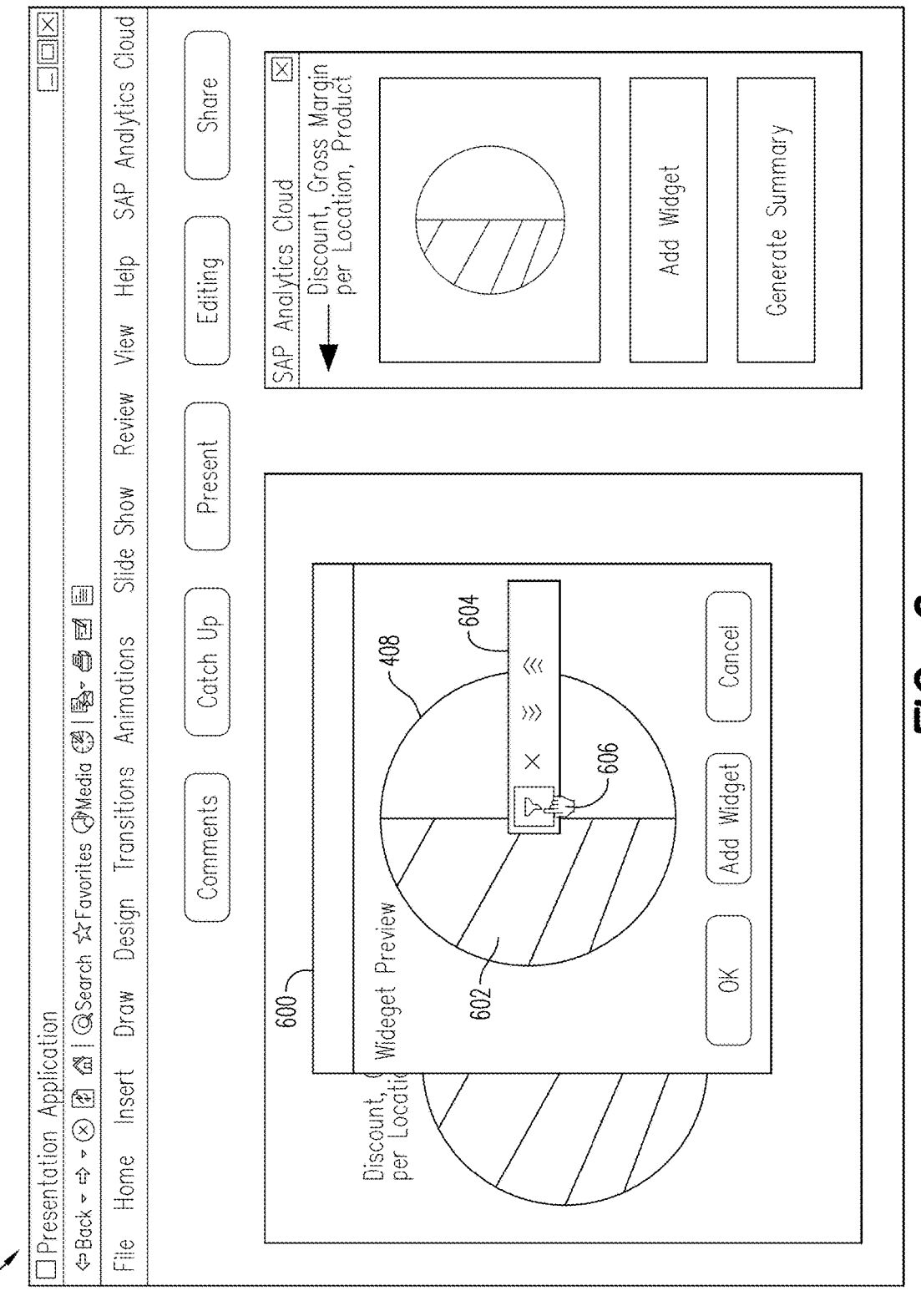
FIG. 6 is a user interface including state change options according to some embodiments.
Figure 7:
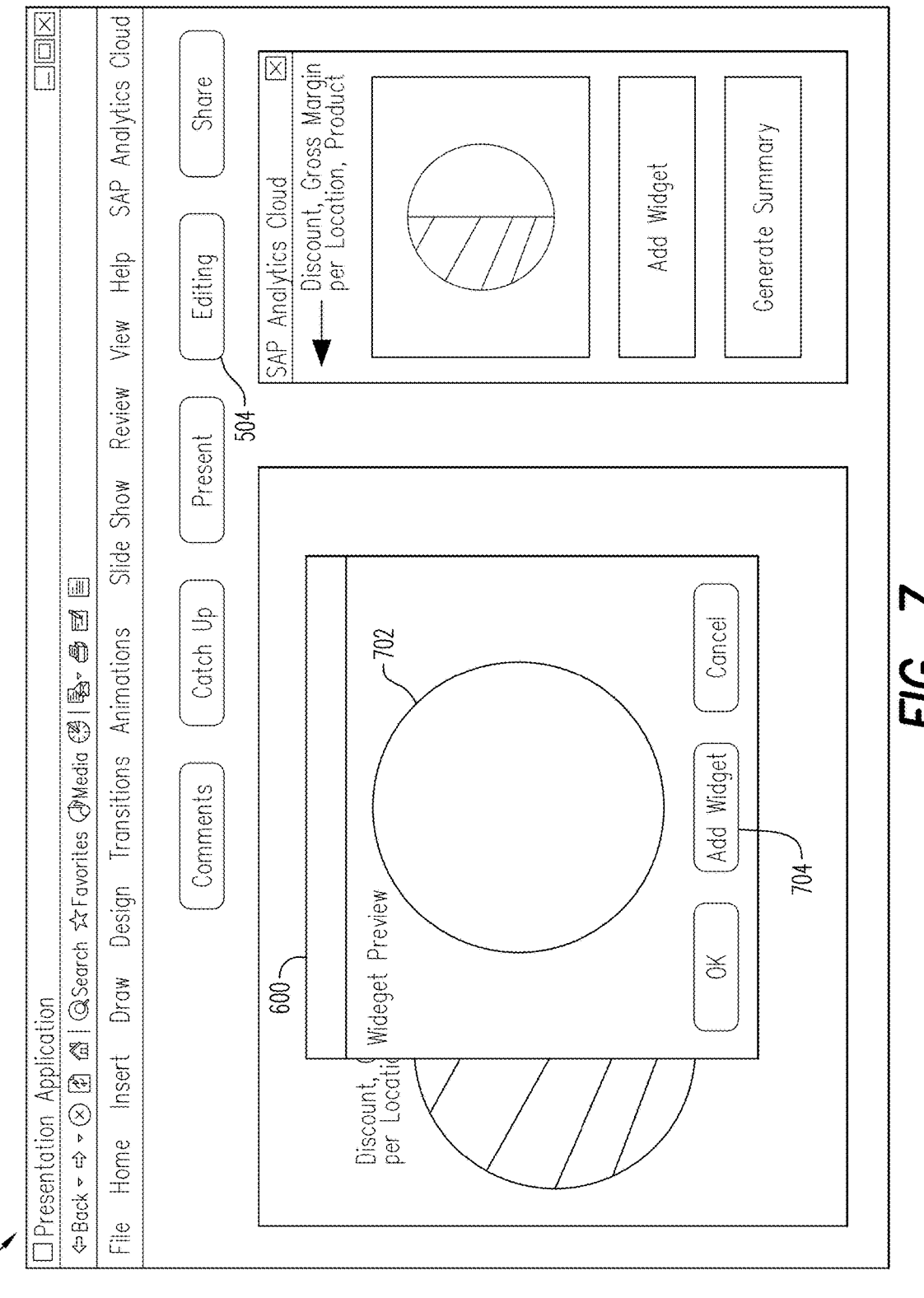
FIG. 7 is a user interface including a state change to the visualization in FIG. 5 according to some embodiments.

Continuing with the non-exhaustive example, selection of the editing control 504 in FIG. 5 causes the preview pane 600 to pop-up, as shown in FIG. 6. The preview pane 600 includes the GUI element 408. Selection of an element 602 of the GUI element 408 in the preview pane 600 results in the pop-up of a state change ribbon 604 including one or more state change elements 606. Here, the filter state change element 606 is selected, as indicated by the shading. Here, since the data represented by the stripes element 602 of the GUI element 408 was selected, the filter applied in response to selection of the filter state change element 606 filters out that selection, as shown by the non-striped circle in the user interface 700 of FIG. 7. This non-striped circle is the state change GUI element 702.

Figure 8:
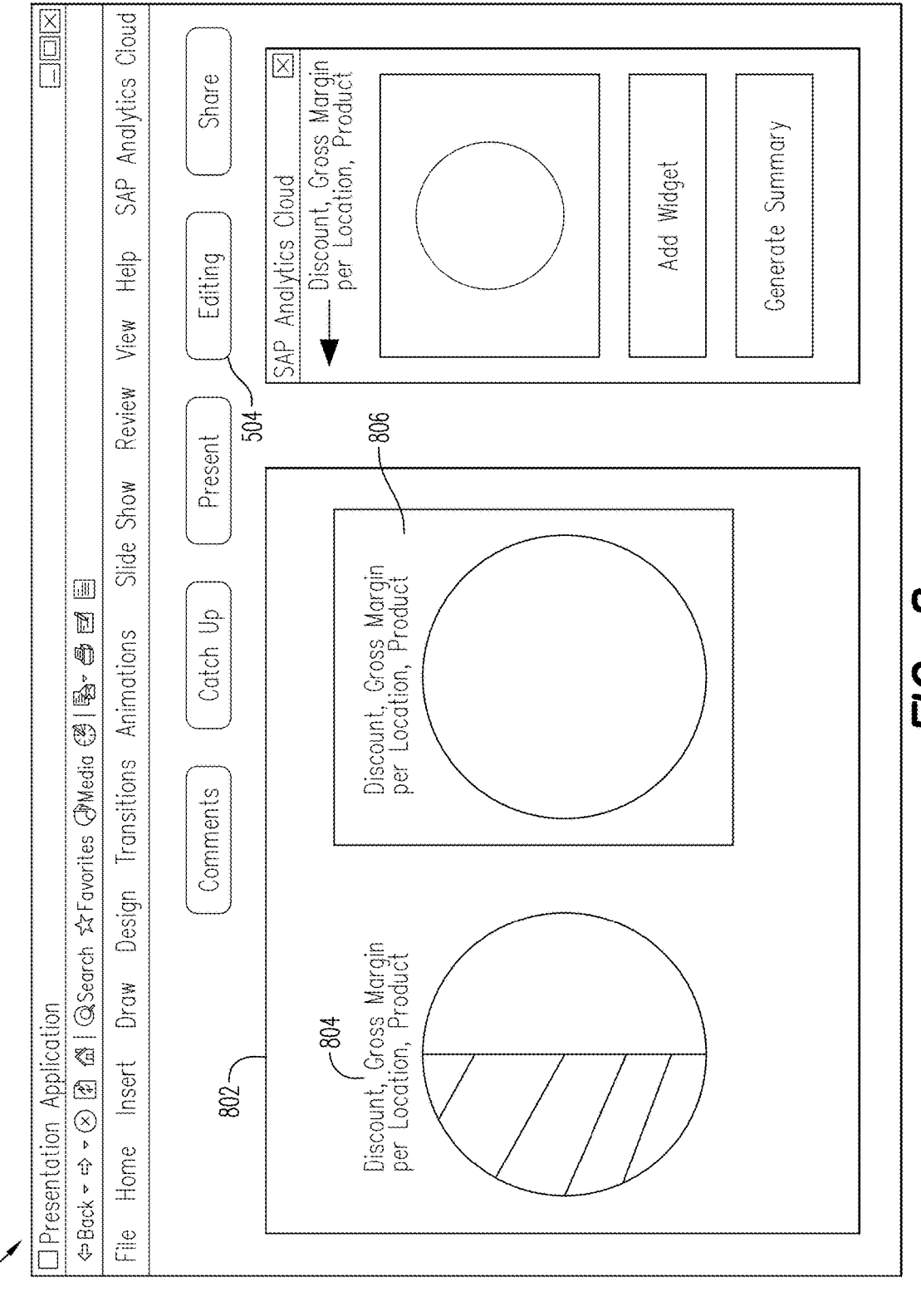
FIG. 8 is a user interface including multiple widgets according to some embodiments.

Turning back to the process 200, it is determined in S214 whether the state change GUI element 702 is added to the slide. Pursuant to one or more embodiments, selection of an Add Widget control 704 in the Preview pane 600 adds the state change GUI element 702 to the slide 802 for display as an image (e.g., chart 806) in the slide, as shown in the user interface 800 of FIG. 8. It is noted that while two charts are displayed in FIG. 8, the left chart 804 is a default view (or initial state view) of the widget, while the right chart 806 is the view of the same widget (e.g., the left chart) except that it has had an interaction/state changed performed thereon. Here, the state change data was filtered out and this view was added to the slide 802 as the right chart 806.

In a case it is determined at S214 the state changed GUI element 702 is not added to the slide 802 (e.g., the Add Widget control 704 was not selected), the process 200 ends at S216.

In a case it is determined at S214 the state change GUI element 702 is added to the slide 802 (e.g., the Add Widget control 704 was selected), the process 200 proceeds to S218 and a bookmark 140 is automatically generated, via the bookmark generator 120, for the current state of the GUI element 702. The bookmark generator 120 in the corresponding application 107 generates the bookmark 140 per the bookmark generator 120 of the state restoration tool 104 of the presentation application. The current state of the GUI element is the state change GUI element.

As described above, the bookmark 140 contains the metadata for the current state of the widget including the story identifier (container ID) and SAC tenant, for example, and for a widget that had state changes applied thereto (e.g., filtering, sorting, etc.), the metadata includes, for example, all of the current filtering selections in the dashboard from dimensions and measures in the visualizations, as well as other state changes to tables and charts, current hierarchical levels, dropdowns, radio button groups, checkboxes, certain kinds of values stored in Script Variables, sorting, and whether a widget is visible or not. In the non-exhaustive example shown herein, the metadata includes the current filtering selections. Pursuant to one or more embodiments, in response to selection of the Add Widget control 704 in the Preview pane 600, the bookmark 140 is generated for the current state of the GUI element. The bookmark 140 is an object in a JSON document. In a case where the state change GUI element 702 is added to the slide as an image, the state restoration tool 104 takes a visual snapshot of this state change GUI element 702. The snapshot is a logical copy of the widget content, captured at a particular point-in-time. The bookmark 140 includes the data from the visual snapshot including a container ID of the state change GUI element. The state restoration tool 104 then makes a backend call to the corresponding application 107 of the backend server 102 to retrieve the initial state of the widget via a render widget API 122. Next, the bookmark generator 120 uses the snapshot of the current state and the initial state of the widget to form the bookmark 140. The bookmark generator 120 includes the container id of the state change GUI element in the bookmark so that the backend server 102 can map the state change GUI element to the bookmark. The bookmark 140 is persisted in the storage device 115.

FIG. 9 includes a non-exhaustive example of a bookmark 900 for the state change GUI element.

It is noted that unlike conventional SAC bookmarks that are created via a manual process of selecting bookmark types, and code, and that save the bookmarks on the backend server, the bookmarks 140 of one or more embodiments are transmitted, via the bookmark generator 120 of the state restoration tool 104, and appended as a bookmark tag 1002 (FIG. 10) of a presentation content file 130 for the image in the slide in S220. The appended bookmark is stored as the tag in S222. A tag 1000 is a custom property that can be applied to the image. The tag may be a key-value pair, where the value is always a string. The tag may be programmatically added to the presentation content file 130 for the current image added to the slide. An API (not shown) stores certain custom tags in the presentation content file 103. FIG. 10 is a diagram showing the tags 1000 for a given image. Here, the image (referred to here as "shape") includes a plurality of tags 1000. In this non-exhaustive example, the tags are a widget name tag, a timestamp of the last refresh tag, a resource ID tag, a widget ID tag, a tenant tag and a bookmark tag. After the bookmark is generated in S218, the state of the current widget saved in the bookmark will be stored as the bookmark tag 1002 ("bookmark", widgetDetails.BOOKMARK) in the presentation content file 130 for the particular image in the slide. It is noted that while the other tags for multiple images of the widget in the slide will be the same because it's the same widget, the bookmark tag will be different because it's a different state of the widget.

Figure 12:
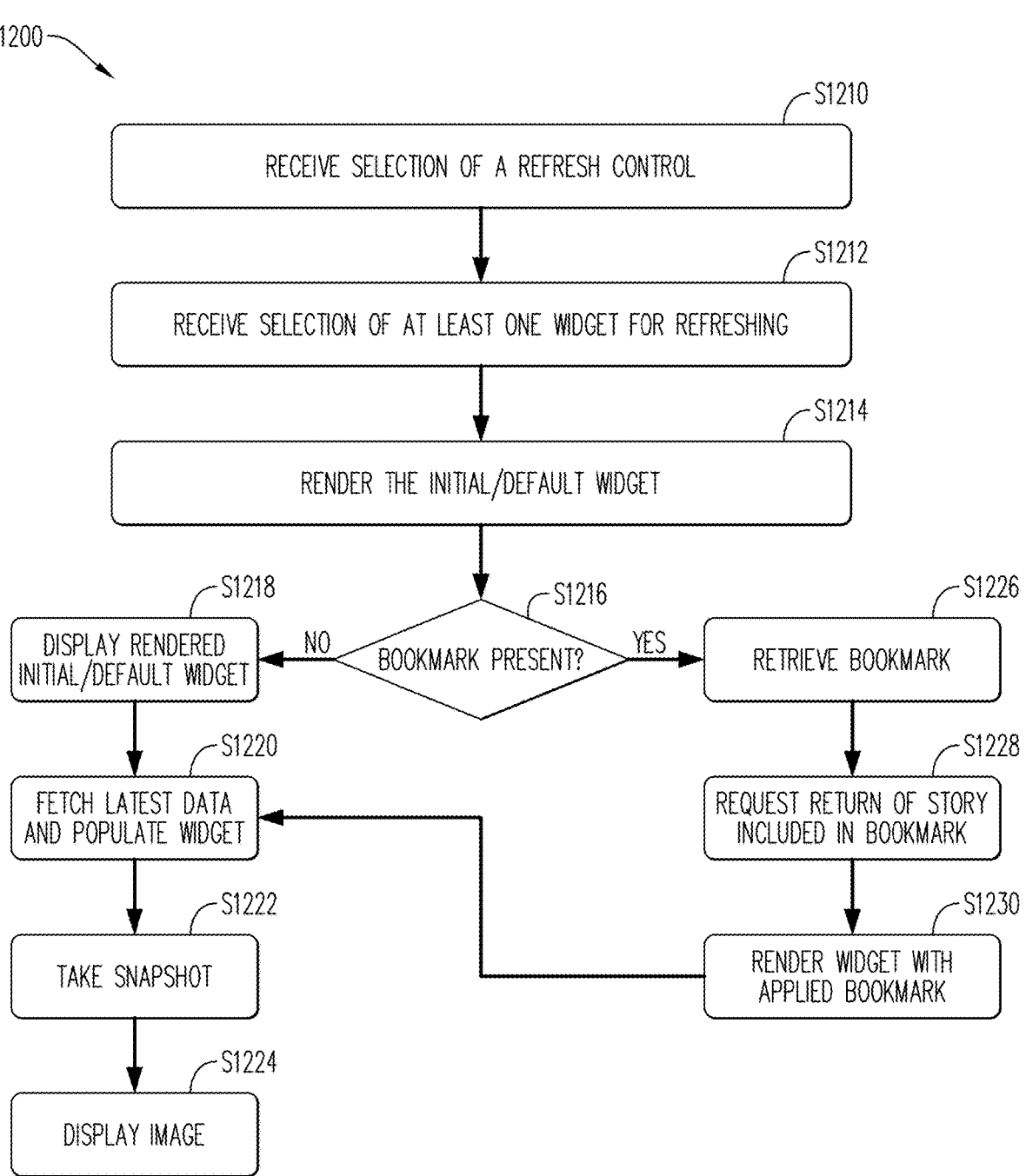
FIG. 12 is a flow diagram of another process according to some embodiments.

Turning to FIG. 12, a refresh process 1200 is provided. The refresh process 1200 may be executed to present the most up-to-date data in the visualization. During the refresh process 1200, the widget is loaded into the slide in the same state as it was when the bookmark was created. To load the widget with the same current state (e.g., state change), the state restoration tool 104 reads the bookmark for the state change from the tag for the presentation content file 130 in which the widget is embedded, and passes the same bookmark string to the render widget API 122 to load the widget in the same state with the latest data from the database 114. It is noted that the bookmark is an option parameter and is passed to the render widget API 122 as the option parameter.

FIG. 11A includes a non-exhaustive example of the render widget API 122. As described above, the render widget API 122 receives as input the following widget parameters: a container id a container ID, which is an identifier of the container element where the widget is rendered; a tenantUrl, which is the url of the SAC tenant which will be connecting to the story ID; a story ID or definition, which is the identifier or definition of the story that has been selected; a widget ID, which is the identifier of the widget to be rendered; and options, which are additional parameters (e.g., tenant, oem, session, filters, variables, etc.) that may impact the rendering. The render widget API 122 receives these widget parameters 152 and then renders the widget. In the case a bookmark was generated for the widget, the render widget API 122 receives the bookmark as the option parameter input 1102. FIG. 11B includes a non-exhaustive example of option parameter input 1102 received by the render widget API 122 for a bookmark.

Figure 13:
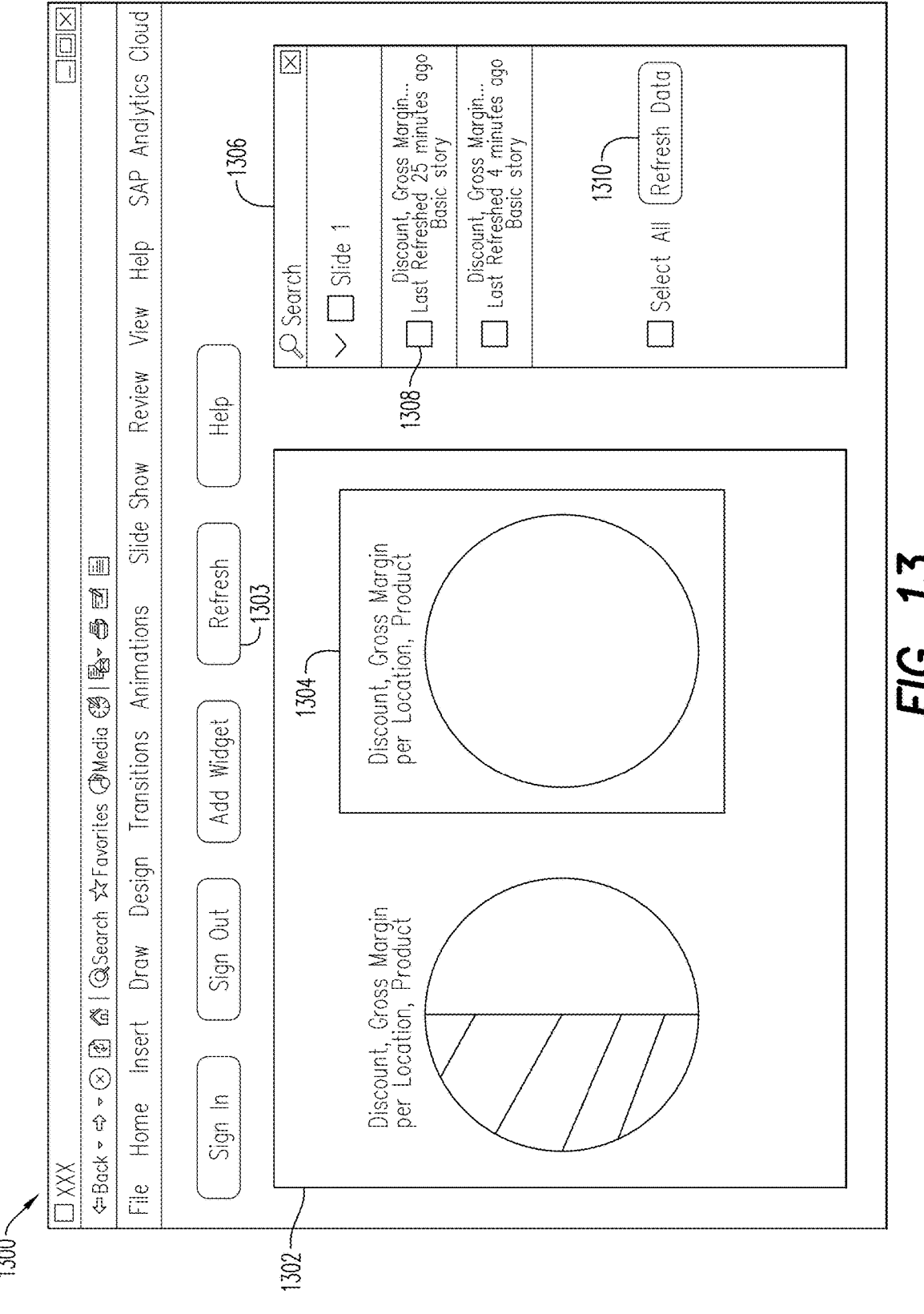
FIG. 13 is a user interface including refreshed data according to some embodiments.

Prior to the process 1200, the user 118 has logged in to the presentation program and connected to the SAC, as described above with respect to FIG. 2. It is noted that connection is established between the presentation application and SAC in a case of creating the bookmark and refreshing the data. The user 118 has also selected the slide they want to refresh. Continuing with the non-exhaustive example described herein, FIG. 13 displays a user interface 1300 including a slide 1302 having two images 1304 thereon. Initially, at S1210 selection of a refresh control 1303 (FIG. 13) on the slide 1302 is received. In response to selection of the refresh control 1303, a refresh pane 1306 is displayed. The refresh pane 1306 lists all of the widgets represented by images 1304 on the slide 1302. The refresh pane 1306 also includes check boxes 1308 or other suitable elements to select the images to refresh. One of the check boxes may be a "Select all" checkbox. In S1212 at least one widget is selected for refreshing.

The refresh pane 1306 also includes a Refresh Data control 1310. Selection of the Refresh Data control 1310 executes the steps to refresh data for the images of the selected check boxes 1308. It is noted that in a case the "Select all" checkbox is checked, the refresh will be executed for all of the images on the slide. It is also noted that when refreshing the data, the state restoration tool 104 replaces the widgets, represented by the images, one by one on the display with the updated (latest) data from the database 114, and takes into consideration the state which was saved onto the slide for the given widget.

It is noted that while some embodiments include selection of the Refresh Data control 1303 to fetch the latest data, in other embodiments, each time the slide is opened the data may be automatically refreshed. Allowing the user to refresh the data via the Refresh Data control 1310 allows the data to remain until a request for the update. Refreshing the data on command (e.g., via selection of a Refresh Data control 1310), allows the user to control the data that is presented.

In response to selection of the Refresh Data control 1310, the render widget API 122 is executed. The render widget API 122 renders the initial/default widgets corresponding to each selected image in a Document Object Model (DOM) in S1214. The DOM is an API that defines how documents are accessed and manipulated, and their logical structure. A snapshot is taken of the rendered widget in the DOM. Additionally, in response to selection of the refresh data control 1310, all of the tags for each selected image are fetched. Then, in S1216, it is determined whether the rendered widget has a bookmark within the presentation content file 130. Pursuant to some embodiments, the determination is made by the state restoration tool 104 analyzing the tags 1000 for the image and identifying the bookmark tag 1002.

In a case it is determined at S1216 the widget does not have a bookmark, the process 1200 proceeds to S1218 and the image for the rendered initial/default widget is displayed. Then, in S1220, an update data API (not shown) fetches the latest data from the database 114, and populates the widget with that data. A snapshot is then taken of the widget with the latest data in S1222, and an image of this snapshot is displayed on the slide in S1224.

In a case it is determined at S1214 the widget does have a bookmark, the process 1200 proceeds to S1226 and the bookmark is retrieved via the Get Bookmark API 124. A non-exhaustive example of the Get Bookmark API 124 is presented in FIG. 11C. The Get Bookmark API 124 receives a Container ID as input. The Container ID is the id of the container element and is the same container id as the one used in the render widget API 122. The bookmark generator 120 includes the container id of the widget in the bookmark so that the backend server 102 can map the widget to the bookmark. Then in S1228, data from the retrieved bookmark 900 (e.g., tenant, format, etc.) is extracted by the state restoration tool 104 and passed in the render widget API 122 as the options parameter, and the render widget API 122 requests the backend to return the story included in the bookmark. It is noted the story is saved in the database 114, not on the client side. The story is retrieved and then, in S1230, the render widget API 122 applies the bookmark state on top of the initial/default state merging the bookmark with the story and renders the widget with the bookmark state applied thereto. The process then proceeds to S1220 and the update data API is called to fetch the latest data from the database 114. The snapshot is then taken of the image— in this case of the rendered widget with the bookmark applied thereto—with the latest data in S1222, and the image is displayed on the slide in S1224. The last refresh time is then updated in the tag.

In one or more embodiments, only the users who have access to a given story in SAC, making them an authorized source, may refresh the widget. However, the slides may be shared with users who have access to the given story in SAC and users who do not have access to the given story in SAC. Pursuant to some embodiments, to increase security of the data, the images may be encrypted such that valid SAC users can view the data. The images may be encrypted via an encryption tool 125 of the state restoration tool 104. Then images in the slide presentation may be viewed after an authorized source logs in to SAC and application of a decryption tool 127 of the state restoration tool 104 to the encrypted image.

Figure 14:
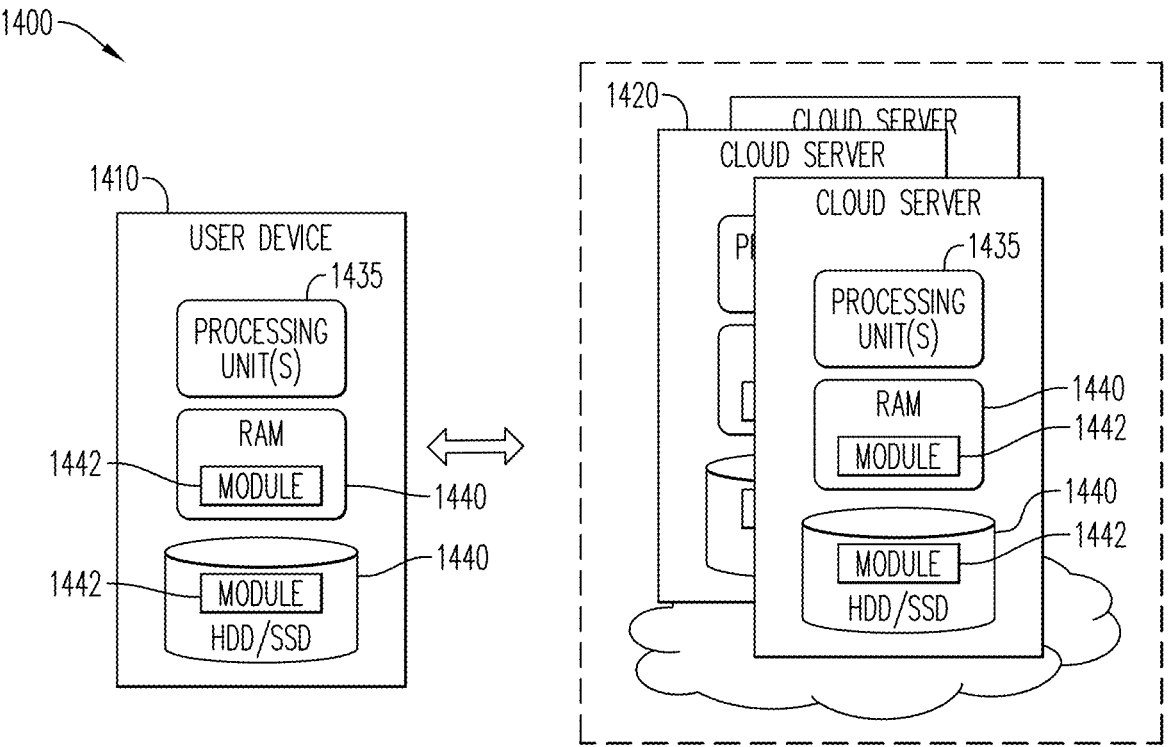
FIG. 14 is a block diagram of a cloud-based architecture according to some embodiments.

FIG. 14 illustrates a cloud-based database deployment 1400 according to some embodiments. The illustrated components may reside in one or more public clouds providing self-service and immediate provisioning, autoscaling, security, compliance and identity management features.

User device 1410 may interact with applications executing on the cloud server 1420, for example via a Web Browser executing on user device 1410, in order to restore a widget state. Cloud server 1420 may comprise cloud-based compute resources, such as virtual machines, allocated by a public cloud provider. As such, cloud server 1420 may be subjected to demand-based resource elasticity. Each of the user device 1410, and cloud server 1420 may include a processing unit 1435 that may include one or more processing devices each including one or more processing cores. In some examples, the processing unit 1435 is a multicore processor or a plurality of multicore processors. Also, the processing unit 1435 may be fixed or it may be reconfigurable. The processing unit 1435 may control the components of any of the user device 1410 and cloud server 1420. The storage devices 1440 may not be limited to a particular storage device and may include any known memory device such as RAM, ROM, hard disk, and the like, and may or may not be included within a database system, a cloud environment, a web server or the like. The storage device 1440 may store software modules 1442 or other instructions/executable code which can be executed by the processing unit 1435 to perform the method shown in FIGS. 2 and 12. According to various embodiments, the storage device 1440 may include a data store having a plurality of tables, records, partitions and sub-partitions. The storage device 1440 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IOT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   a memory storing program code; and one or more processing units to execute the program code to cause the system to:

receive a graphical user interface (GUI) element, the received GUI element having an initial state;

receive at least one state change to the received GUI element, the at least one state change resulting in the GUI element having a current state;

generate a bookmark for the current state of the GUI element;

append the generated bookmark to a presentation content file as a tag; and store the appended bookmark in the tag.

2. The system of claim 1, wherein the bookmark is generated in response to copying an image of the current state of the GUI element to a side of a presentation application.

3. The system of claim 1, wherein the current state is different from the initial state.

4. The system of claim 1, wherein the tag is mapped to a given image in the presentation content file.

5. The system of claim 4, wherein the presentation content file for the given image includes the tag and at least one of: a GUI element identifier tag, a GUI type tag, a GUI name tag, and a tenant tag.

6. The system of claim 1, further comprising program code to cause the system to:

receive a refresh request for the GUI element having the current state;

determine the GUI element having the current state has the stored appended bookmark;

render the initial state of the GUI element;

retrieve the stored appended bookmark;

apply the retrieved appended bookmark to the rendered initial state of the GUI element;

render the current state of the GUI element with updated data; and display the rendered current state of the GUI element with the updated data on a user interface.

7. The system of claim 6, wherein the current state of the GUI element is rendered via a GUI element render Application Programming Interface (API).

8. The system of claim 6, wherein the stored appended bookmark is retrieved via a Get Bookmark Application Programming Interface (API).

9. The system of claim 6, further comprising program code to cause the system to:

determine the refresh request is received from an authorized source.

10. The system of claim 6, further comprising program code to cause the system to:

encrypt an image of the rendered current state of the GUI element including the appended bookmark.

11. The system of claim 1, wherein the at least one state change is one of a filter, a sort, a ranking, a combine and split, an add, and a remove.

12. The system of claim 1, wherein the generated bookmark is in a JavaScript Object Notation (JSON) format.

13. A computer-implemented method comprising:

receiving a graphical user interface (GUI) element, the received GUI element having an initial state;

receiving at least one state change to the received GUI element, the at least one state change resulting in the GUI element having a current state;

generating a bookmark for the current state of the GUI element;

appending the generated bookmark to a presentation content file as a tag, wherein the tag is mapped to a given image in the presentation content file; and storing the appended bookmark in the tag.

14. The method of claim 13, wherein the bookmark is generated in response to copying an image of the current state of the GUI element to a side of a presentation application.

15. The method of claim 13, further comprising:

receiving a refresh request for the GUI element having the current state;

determining the GUI element having the current state has the stored appended bookmark;

rendering the initial state of the GUI element;

retrieving the stored appended bookmark;

applying the retrieved appended bookmark to the rendered initial state of the GUI element;

rendering the current state of the GUI element with updated data; and displaying the rendered current state of the GUI element with the updated data on a user interface.

16. The method of claim 15, wherein the current state of the GUI element is rendered via a GUI element render Application Programming Interface (API).

17. The method of claim 13, wherein the at least one state change is one of a filter, a sort, a ranking, a combine and split, an add, and a remove.

18. One or more non-transitory, computer-readable medium storing instructions, that, when executed by a computing system, cause the computing system to perform operations comprising:

receiving a refresh request for a Graphic User Interface (GUI) element having a current state;

determining the GUI element having the current state has a stored appended bookmark;

rendering an initial state of the GUI element;

retrieving the stored appended bookmark;

applying the retrieved appended bookmark to the rendered initial state of the GUI element;

rendering the current state of the GUI element with updated data; and displaying the rendered current state of the GUI element with the updated data on a user interface.

19. The one or more non-transitory computer-readable medium of claim 18, wherein the bookmark is generated in response to copying an image of the current state of the GUI element to a side of a presentation application.

20. The one or more non-transitory computer-readable medium of claim 18, further comprising, a refresh process comprising:

receiving a refresh request for the GUI element having the current state;

determining the GUI element having the current state has the stored appended bookmark;

rendering the initial state of the GUI element;

retrieving the stored appended bookmark;

applying the retrieved appended bookmark to the refresh process rendered initial state of the GUI element;

rendering the current state of the GUI element with updated data; and displaying the rendered current state of the GUI element with the updated data on the user interface.

\* \* \* \* \*